United States Patent [19]
Ovanin

[11] 3,984,114
[45] Oct. 5, 1976

[54] CHUCK WITH ANTI-CENTRIFUGAL FORCE FEATURE

[75] Inventor: George J. Ovanin, Euclid, Ohio

[73] Assignee: The S-P Manufacturing Corporation, Solon, Ohio

[22] Filed: Apr. 4, 1975

[21] Appl. No.: 565,207

[52] U.S. Cl. ............................ 279/119; 279/1 C
[51] Int. Cl.² ................................ B23B 31/16
[58] Field of Search ............ 279/1 C, 1 F, 66, 110, 279/118, 119, 123; 269/270, 282

[56] References Cited
UNITED STATES PATENTS

| | | | |
|---|---|---|---|
| 2,722,427 | 11/1955 | Labeyrie | 279/119 |
| 2,839,307 | 6/1958 | Garrison et al. | 279/1 C |
| 3,370,859 | 2/1968 | Benjamin et al. | 279/119 |

Primary Examiner—Robert L. Spruili
Attorney, Agent, or Firm—Watts, Hoffmann, Fisher & Heinke Co.

[57] ABSTRACT

A rotary chuck with lever operated jaws, in which the levers are constructed to counteract the force-reducing effect of centrifugal force on the work-gripping jaws. The levers include a counterbalancing portion large with respect to either arm of the lever, that is wholly contained within the chuck body and extends substantially parallel to the axis of rotation of the chuck when the jaws are in a work-gripping position. A new master jaw construction facilitates mounting collet pads with a minimum of weight to reduce the adverse effects of centrifugal force.

8 Claims, 6 Drawing Figures

CHUCK WITH ANTI-CENTRIFUGAL FORCE FEATURE

BACKGROUND OF THE INVENTION

1. Field of the Invention

This invention relates to a rotary chuck constructed to reduce the effect of centrifugal force on work-gripping jaws.

2. Prior Art

Rotary chucks with radially movable jaws for gripping work located at the rotary axis of the chuck are commonly used for machining operations. In certain chuck constructions the jaws are moved through internal lever mechanisms, such as bell crank-type levers of which one arm engages the back of a movable jaw and the other cooperates with an axially movable lever actuator. Typically, the actuator is moved with a draw rod or tube connected through the back of the chuck and actuated by a hydraulic cylinder.

When a jaw chuck is rotated at relatively high speeds, centrifugal force tends to move the chuck jaws radially outward, in opposition to the work-gripping force applied through the jaw-actuating levers. At high speeds of rotation, such as 3500 revolutions per minute and above, the gripping force of the jaws of a chuck is substantially decreased to the extent that the ability to adequately hold the work during machining is lost. Rotating the work at high speeds, of course, reduces machining time and, hence, lowers the cost of production.

A number of approaches have been suggested for counteracting the centrifugal force acting on chuck jaws. For example, weighted slides have been provided within chucks movable in opposite directions to the jaws, and connected to the jaws with pivoted levers (see, for example, U.S. Pat. Nos. 2,657,068; 2,729,459 and 2,828,134). Pivoted rather than slidable jaws have been used, where an integral part of the jaw acts as a counterweight to offset the centrifugal force on a work-gripping portion and/or to supply force for gripping the workpiece (see, for example, U.S. Pat. Nos. 2,784,977 and 2,839,307). Separate counterbalances have been appended to the work-gripping jaws (U.S. Pat. NO. 2,982,558) and sliding weights have been provided to cam a collet into work-gripping contact in response to rotation (U.S. Pat. No. 2,367,863). In addition, separately attached counterweights of relatively dense material have been secured to jaw-actuating levers (U.S. Pat. No. 3,370,859).

SUMMARY OF THE INVENTION

The present invention embodies an improved lever structure for operating radially movable jaws of a rotary chuck. The jaw-actuating levers are constructed with counterweight portions that, in response to centrifugal force created by rotation of the chuck, apply forces to the jaws in directions toward the central axis of the chuck body. The construction is such that, at high rotation speeds, there is little or no decrease in the work-gripping force applied by the jaws.

The levers of the present invention incorporate a novel construction that maximizes the counterweight mass that can be accommodated in conventional internal cavities of the chuck body and that assures application of the greatest force moment counteracting the centrifugal force at the closed position of the jaws. Also, an improved master jaw that facilitates the mounting of collet pads with a minimum of weight is provided to reduce the adverse affect of centrifugal force on the work-gripping force applied through the jaws.

More specifically, master jaws that carry work-gripping jaws (for example, top jaws or collet pads) are slidable radially in a cylindrical chuck body and are operated by levers within cavities of the body behind the master jaws. The levers are of the bell crank-type, i.e., they have two arm portions angularly related and are pivoted at the juncture of the arm portions. A shorter one of the arm portions extends forward from the pivot into engagement with the master jaw, and a longer one extends toward the center of the chuck into engagement with an axially movable lever actuator that rocks the levers to move the jaws.

A third portion is provided on each lever in the form of a counterbalance that extends rearwardly of the pivot axis, away from the master jaw, but which is completely confined within the chuck body for safety. The counterbalance portion is greater in length than either of the arm portions, is rectangular in cross-section and extends the full width of the master jaw, is equal in height to the length of the second or longer arm portion (except for a terminal part of the second portion that engages the lever actuator), and is of greater mass than either of the other lever portions.

Longitudinal surfaces of the counterbalance lever portion that face outwardly and inwardly of the chuck body extend at an angular relationship to each other equal to the angle through which each lever arm pivots in opening and closing the chuck jaws. The outwardly facing surface is parallel to the axis of the chuck and directly adjacent the outer terminus of the lever cavity, when the lever is pivoted to a position where the associated jaw is closed, i.e., in a work-gripping portion. The inwardly facing surface is parallel to the chuck axis and directly adjacent the central lever actuator when the lever is pivoted to a position where the jaw is open.

The above-described construction of the counterweight portion of each lever arm not only fills the respective lever cavity to the maximum extent possible, consistent with the degree of pivoting required, but also orients the longitudinal extent of the counterweight portion from the pivot axis of the lever parallel to the axis of rotation of the chuck, when the chuck jaws are in a closed position. As a result, centrifugal force of each counterweight during chuck rotation will exert the maximum force moment available on the master jaw in a direction to counteract the centrigual force on the jaws that tends to reduce the gripping force.

The counterweight portion of each lever swings freely and unguided with the lever, eliminating the disadvantage of frictional resistance that a sliding counterweight experiences. On the other hand, movement of the jaws is obstructed by friction between the master jaws and the guideways of the chuck body. As a result, the counterweight portions of the levers can more than counterbalance their own force moments, thereby permitting the use of heavier work-gripping jaws while adequately counterbalancing the effects of centrigual force.

While a typical lever embodying the present invention is constructed of steel, where additional counterbalancing force is desired, the counterweight portion of the lever can be modified to provide a chamber that can be filled with a material of greater density than steel, such as lead. By containing the heavier material in the lever rather than attaching it as an arm, the strength and structural characteristics of the denser material are relatively unimportant.

For optimum gripping force, master jaws are provided each with flanges at the radially inward end. The flanges and the end of each jaw are constructed to directly receive a collet pad, which is securable with a single machine screw. The substantial savings in weight of this construction, coupled with the counterweighted levers, results in a chuck in which centrifugal forces are completely counterbalanced, permitting high rotational speeds without reduction in work-gripping force. Further, the master jaws are capable of carrying conventional top jaws as well.

The above and other features and advantages of this invention will become more apparent as the invention is better understood from the following detailed description, when considered in connection with the accompanying drawings.

DETAILED DESCRIPTION OF THE PREFERRED EMBODIMENT

Figure 1:
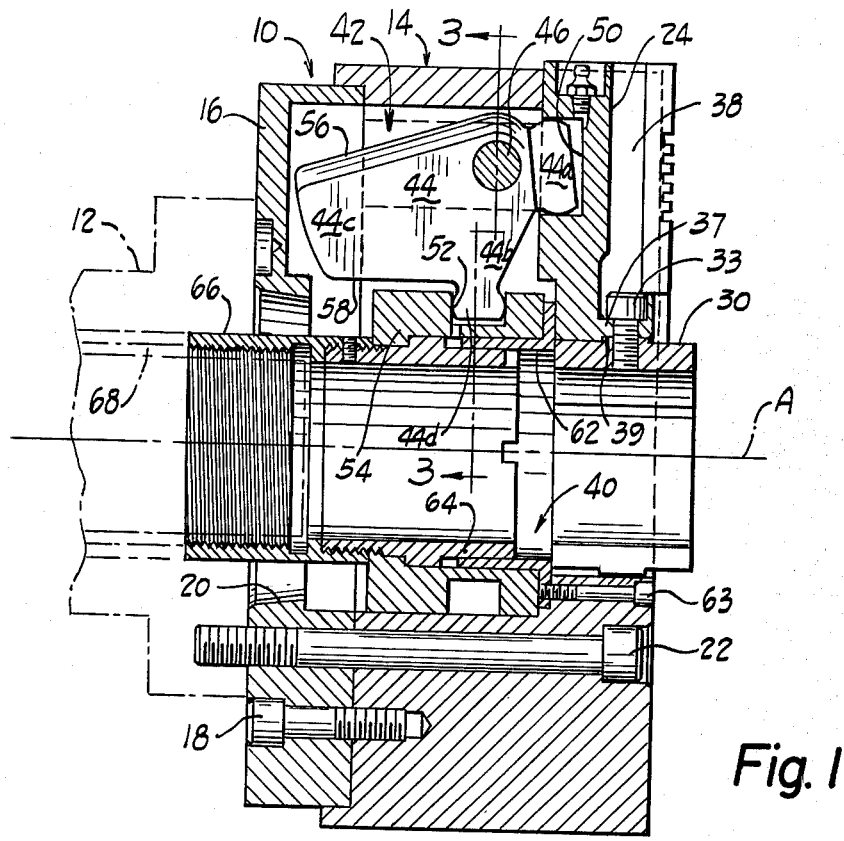
FIG. 1 is a longitudinal section view of a chuck embodying the present invention, taken along the line 1—1 of FIG. 2, illustrating a master chuck jaw and collet pad and in which the jaw is in an open position.

With reference now to the drawings, a rotary chuck embodying the present invention is indicated generally by the reference numeral 10 and is constructed to be carried on a rotatable spindle 12 of a machine tool. The rotary chuck is comprised of a cylindrical body 14 having a central axis A and a back plate 16 secured to the body by screws 18. The back plate 16 has a central opening 20 and serves to close the back of the body 14 and to locate the chuck on the spindle 12 with the axis A coincident with the spindle axis. The central opening 20 facilitates the passage of work through the chuck and the actuation of the chuck through the rotary spindle. Screws 22 secure the body to the spindle 12.

Figure 5:
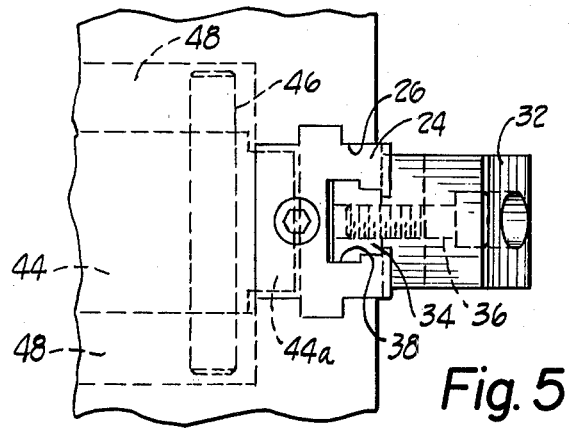
FIG. 5 is a plan view taken along the line 5—5 of FIG. 6.

Three radially slidable master jaws 24 are movable in ways 26 (FIGS. 2 and 5) in a front face 28 of the body 14. The master jaws serve to carry collet pads 30 (FIGS. 1 and 2) or work-gripping top jaws 32 (FIG. 6) for gripping the periphery of a work piece located at the axis of the chuck body. Each pad 30 is secured to the respective master jaw by a single screw 33, and each work-gripping top jaw 32, as an alternative, is secured to the respective master jaw by a jaw nut 34, a key 35 and machine screws 36. The master jaw is especially constructed for a collet pad 30. For that purpose it has a concave flange portion 37 extending forwardly and at the radially inward end of the jaw, across the bottom of a longitudinal front T-slot 38 of the jaw. The T-slot receives the screw 33 when the collet pad is used and receives the jaw nut 34 when the alternative top jaws are used. The flange portion 37 has a peripheral groove 39 in the concave surface which serves to locate and orient the respective pad 30. This construction of the master jaw, when used with collet pads, results in an extremely lightweight work-gripping mechanism that minimizes the adverse affect of centrifugal force in the work-gripping force applied through the jaws.

The chuck body 14 has a central through passage 40 that communicates with the opening 20 of the back plate and, in addition, has three radial cavities 42, one behind each master jaw, in communication with the central passage. Each cavity 42 houses a jaw-actuating lever 44 supported by a lever pin 46, each end of which is carried in a pin bearing 48 on opposite sides of the respective cavities 42.

Each jaw-actuating lever 44 is of a bell crank-type, adapted to rock about the respective lever pin 46 to move the associated master jaw 24 radially in the jaw slide. A first portion 44a of each lever forms a shorter lever arm that extends forward of the pivot axis formed by the pin 46. This first portion 44a engages an associated master jaw 24 in a rearwardly opening transverse slot 50. A second portion 44b forms a longer lever arm that extends radially inward to the central through passage 40, where a distal end engages a peripheral slot 52 of an annular lever actuator 54. A third portion 44c of each lever is elongated from the pivot axis rearwardly of the chuck body and forms a counterbalance for the master jaw and attached work-gripping pad or top jaw.

Figure 3:
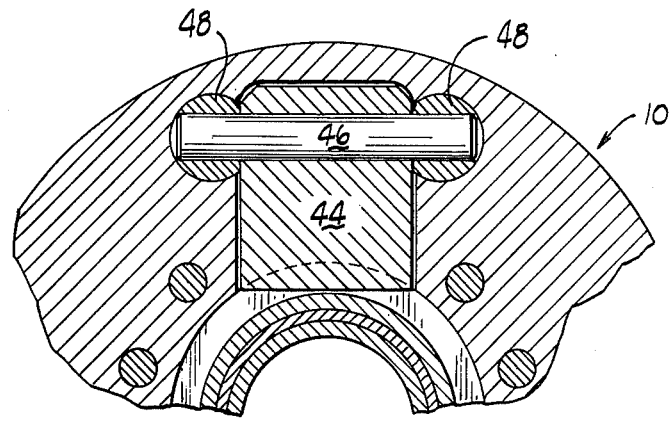
FIG. 3 is a partial sectional view taken along the line 3—3 of FIG. 1.

Each jaw actuating lever 44 is rectangular in cross-section, as best shown in FIG. 3, and is essentially equal in width throughout the width of the receiving cavity 42 and master jaw 24. See FIG. 5. Further, the counterbalance portion 44c is contiguous with the arm portion 44b, except for a distal portion 44d that engages the actuator 54, thereby maximizing the mass of the counterbalance portion 44c.

Figure 2:
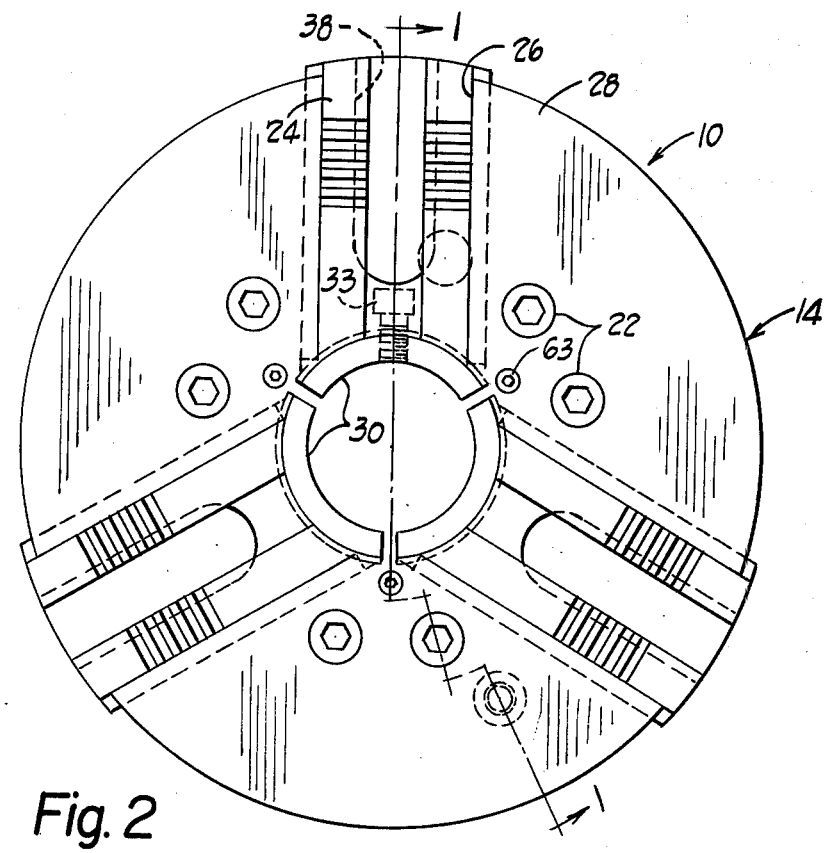
FIG. 2 is a front elevational view of the chuck of FIG. 1.
Figure 6:
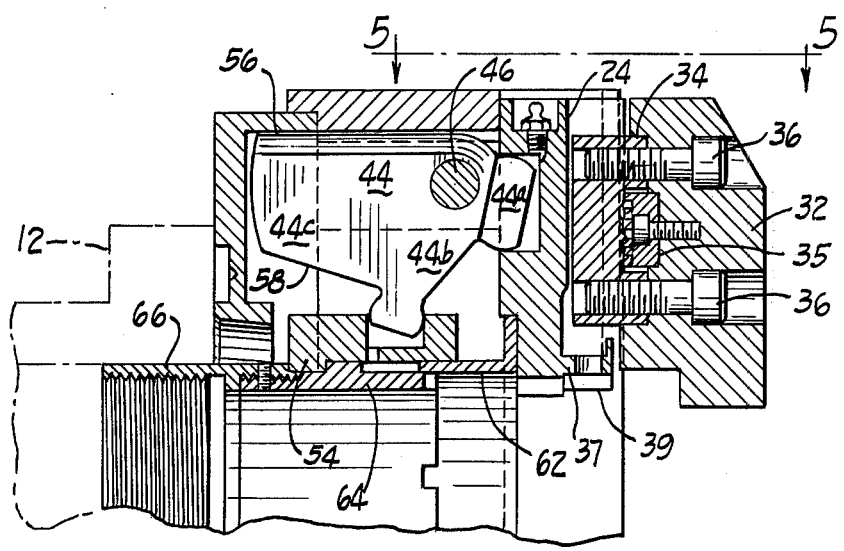
FIG. 6 is a partial longitudinal section view, similar to FIG. 1, illustrating a work-gripping top jaw rather than the collet of FIG. 1, and in which the jaw is in a work-gripping rather than open position.

An outwardly facing, longitudinally extending, surface 56 of each lever and an inwardly facing surface 58 are angularly related to each other so that each is parallel to the central axis A of the chuck when the levers are positioned at either extreme of their pivoting movement, i.e., at the closed and opened positions of the master jaws. Thus, as shown in FIG. 1, the inwardly facing surface 58 of each lever is directly adjacent the actuator 54 when the jaws are radially outward, and as shown in FIG. 6, the outwardly facing surfaces 56 are directly adjacent the wall of the chuck body at the outer end of the cavities 42 when the jaws are in a closed or central position. The angular relationship, then, between the surfaces 56 and 58, corresponds to the angle through which the levers pivot in actuating the chuck jaws. As a result of this construction, the counterbalance portions 44c of the levers are as large as the cavities 42 permit, consistent with the pivoting of the levers that is required to operate the jaws.

The general extent of the counterbalance portion 44c of each lever, considered in its rearward direction from the respective pivot pin, is substantially parallel to the axis of rotation of the chuck body, when the jaws are closed. This is shown in FIG. 6. Thus, with the jaws in a closed position, the radial force acting on the counterbalance portions 44c, considered to act through the center of gravity, will act substantially at right angles to the extent of each portion 44c, utilizing the maximum effective lever arm length of the counterbalance portion to apply the maximum counterbalancing force moment to the lever in a counterclockwise direction as seen in FIG. 6.

The actuator 54 receives each lever 44 in the slot 52 so that movement of the actuator will rock the levers and operate the jaws. The actuator surrounds a guide bushing 62 secured in the central passage by machine screws 63. An annular operator 64 guided within the bushing 62 carries the actuator for axial movement. The operator 64 is constructed for attachment by a collar 66 to a draw tube 68 shown in phantom in FIG. 1. The collar is threaded to the operator 64 and extends through the opening 20 in the back plate. Reciprocation of the collar 66 and operator 64 moves the actuator 54 to rock the levers 44 and move the master jaws radially. The actuator is shown in the forward position in FIG. 1, with the levers 44 brought to their open position, and in its rearward position in FIG. 6, with the levers rocked clockwise from the position shown in FIG. 1, to their closed position.

Figure 4:
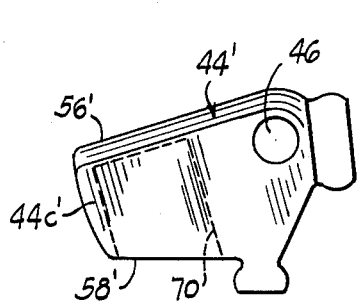
FIG. 4 is a side elevational view of a modified lever of the type shown in FIG. 1.

A second embodiment of a lever arm 44' is shown in FIG. 4, identical to the arm described above in connection with FIGS. 1–3, 5 and 6, except for a cavity 70 in the counterbalance portion 44c'. The cavity opens through the surface 58' and extends substantially the width of the portion 44c', terminating short of the surface 56'. For convenience of manufacture, the cavity 70 may be cylindrical in shape, although a rectangular shape would maximize its volume. The dimensions of the cavity are of course controlled by the size of the lever, but the intention is to provide a relatively large cavity adjacent the distal end of the portion 44c', capable of being filled by a material of greater density than the material of which the lever arm is made. For example, the actuating levers are typically made of steel and it is contemplated that the cavity 70 would be filled with material such as lead. The cavity has the advantage of permitting the use of a heavier material for a counterbalancing portion, without being limited to the structural strength of such a material, and without the machining or assembly that would be required if the lever were fabricated of two different portions to be mechanically joined.

In operation, with the draw tube 68 in a forward position as shown in FIG. 1, work is inserted within the pads 30 (FIGS. 1 and 2) or the top jaws 32 (FIG. 6). The draw tube is then withdrawn, i.e., moved to the left in the orientation of FIG. 1, typically by a hydraulic actuator (not shown) to apply a substantial gripping force to a workpiece between the jaws or collet pads. Force is applied through the actuator 54 and actuating levers 44 to the master jaws 24. The spindle 12 and chuck 10 are rotated to facilitate machining of the gripped workpiece. The rotation of the chuck produces a centrifugal force on the master jaws and collet pads or top jaws that tends to reduce the effective gripping force on the workpiece. At rotational speeds of 3500 rpm and upward, the gripping force without a lever construction that provides a counterbalancing force can be substantially reduced so that with typical hydraulic pressures and chuck actuators, the work cannot be adequately held for machining at such speeds. Yet, with the construction shown and described herein, the centrifugal force acts on the counterbalancing portions 44c, producing a force moment that substantially counteracts the centrifugal force upon the master jaws and work-gripping jaws or collet pads.

By way of example, a lever arm constructed as shown in FIGS. 1–3, 5 and 6, used with master jaws as shown and top jaws as shown in FIG. 6, resulted in a weight of 6 pounds, 6 ounces (including the forward part 44a of the jaw-actuating lever), acting in a counterclockwise direction as viewed in FIG. 1. The weight of the mass rearwardly of the pivot axis, acting in a clockwise direction when the chuck is rotated, was 3 pounds, 3 ounces. A load cell was gripped by the top jaws under a draw bar force of 13,000 pounds applied through a hydraulic cylinder. The chuck was rotated at various rotational speeds up to 3600 rpm and the force on the load cell was recorded. No decrease in gripping force throughout the range of rotational speeds was detected. With the master jaws and collet pads as disclosed herein, it is believed that the gripping force under the same circumstances would actually increase with rotation because of the lighter weight of the collet pads and mounting structure.

While preferred embodiments of the present invention have been described in detail, it will be understood that various modifications or alterations may be made therein without departing from the spirit or scope of the invention set forth in the appended claims.

What is claimed is:

1. A chuck comprising a body with a central axis about which the chuck is adapted to be rotated, a front face, a radially movable master jaw for carrying a work-gripping member and slidable in the front face toward and away from said central axis, a jaw-actuating lever within the chuck body behind the jaw, means carried by the chuck body supporting the lever for pivoted movement about a pivot axis parallel to the front face and transverse to the direction of radial movement of the master jaw, and a lever actuator within the chuck body movable axially to pivot the lever, said lever actuator having a surface in contact with a portion of said lever to exert a force thereon, when moved, in a direction essentially axially of the chuck body, said lever having a first portion extending toward the front face from the pivot axis, a second portion longer than the first portion, extending toward the center of the chuck body from the pivot axis, and having a distal end coacting with the actuator, and a third portion elongated in a direction from the pivot axis away from the front face, longer and of greater mass than the first or second lever portion, the direction of elongation of the third portion extending from the pivot axis substantially parallel to said central axis of the chuck body when the lever is pivoted to a position in which the master jaw is moved toward the central axis.

2. A chuck as set forth in claim 1 wherein the master jaw has a longitudinal T-slot in a front face and a transverse flange at the radially inward end of the jaw, said flange being concave in the radially inward direction and having an aperture through said flange for receiving a screw, and means forming a part of the concave surface for orienting a work-gripping member against the surface.

3. A chuck as set forth in claim 1 wherein the width of the third portion of the lever is equal to the width of the master jaw.

4. A chuck as set forth in claim 1 wherein the third portion of the lever has a cavity remote from the pivot axis and the cavity contains a material of greater density than that of the lever.

5. A chuck as set forth in claim 1 wherein the height of the third portion of the lever is substantially the same as and contiguous with the length of the second portion, except for the said distal end that coacts with the actuator.

6. A chuck as set forth in claim 5 wherein the third portion of the lever has a flat longitudinal surface forming a side that faces radially outward and a flat longitudinal surface forming a side that faces centrally of the chuck body, the two said surfaces having an angular relationship one to the other equal to the angle through which the lever pivots in moving the master jaw toward and away from the central axis.

7. A chuck as set forth in claim 6 wherein the third portion of the lever has a cavity remote from the pivot axis and the cavity contains a material of greater density than that of the lever.

8. A chuck as set forth in claim 7 wherein the master jaw has a longitudinal T-slot in a front face and a transverse flange at the radially inward end of the jaw, said flange being concave in the radially inward direction and having an aperture through said flange for receiving a screw, and means forming a part of the concave surface for orienting a work-gripping member against the surface.

* * * * *